United States Patent
Cai et al.

(10) Patent No.: US 10,657,620 B2
(45) Date of Patent: May 19, 2020

(54) POOLING METHOD, DEVICE, AND SYSTEM, COMPUTER-READABLE STORAGE MEDIUM

(71) Applicant: ThinkForce Electronic Technology Co., Ltd, Shanghai (CN)

(72) Inventors: Jinchi Cai, Shanghai (CN); Xiaopeng Li, Shanghai (CN); Liang Chen, Shanghai (CN)

(73) Assignee: THINKFORCE ELECTRONIC TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 16/362,338

(22) Filed: Mar. 22, 2019

(65) Prior Publication Data

US 2019/0304057 A1  Oct. 3, 2019

(30) Foreign Application Priority Data

Mar. 29, 2018  (CN) .......................... 2018 1 0272844

(51) Int. Cl.
*G06T 1/60* (2006.01)
*G06F 17/15* (2006.01)
*G06T 1/20* (2006.01)
*G06F 12/02* (2006.01)
*G06K 9/54* (2006.01)
*G06K 9/46* (2006.01)

(52) U.S. Cl.
CPC ............ *G06T 1/60* (2013.01); *G06F 12/0207* (2013.01); *G06F 17/153* (2013.01); *G06K 9/4671* (2013.01); *G06K 9/54* (2013.01); *G06T 1/20* (2013.01); *G09G 2360/121* (2013.01)

(58) Field of Classification Search
None
See application file for complete search history.

(56) References Cited

U.S. PATENT DOCUMENTS

| 5,432,870 A * | 7/1995 | Schwartz | ................ | H04N 1/41 |
| | | | | 375/E7.09 |
| 2017/0004092 A1* | 1/2017 | Haraden | ................ | G06F 13/28 |
| 2019/0205735 A1* | 7/2019 | Smelyanskiy | .......... | G06F 17/16 |
| 2019/0205738 A1* | 7/2019 | Bannon | ................ | G06K 9/342 |

* cited by examiner

*Primary Examiner* — Joni Hsu
(74) *Attorney, Agent, or Firm* — Anova Law Group, PLLC

(57) ABSTRACT

Described herein is a pooling method, device, and system, computer-readable storage medium. The pooling method, comprising: acquiring pixel data of each row where a pooling window is located row by row, each time after the pooling window is moved vertically, wherein the size of the pooling window is N×N, N is a positive integer; writing the acquired pixel data of the first N−1 rows or a pre-pooling result thereof into a cache; and performing a pooling operation on the pixel data of last row where the pooling window being located and pixel data in the cache, when the pixel data of last row being acquired; outputting a pooling result of the pooling operation. The technical solution of the invention may improve the pooling efficiency and the system performance.

20 Claims, 5 Drawing Sheets

POOLING METHOD, DEVICE, AND SYSTEM, COMPUTER-READABLE STORAGE MEDIUM

TECHNICAL FIELD

This invention relates generally to the field of image processing. More particularly, the invention relates to a pooling method, device, and system, computer-readable storage medium.

BACKGROUND

In image processing, a pooling operation is usually performed, in order to reduce the data volume to be processed or stored. For example, after the features are obtained by convolution, the next step is to use these features for classification. However, this operation faces the challenge of large amount of computation. Therefore, in order to describe a larger image, aggregation statistics, that is, pooling, may be performed on features at different locations.

The pooling scheme common-used in neural network is a software-based scheme. The pooling computing involves three parts: input data, pooling operations, and output results. Specifically, the central processing unit (CPU) or the convolution hardware accelerator saves the two-dimensional image data structure to be pooled on the main memory; the two-dimensional array of the data structure is denoted as img[height][width], wherein height is the height of the two-dimensional array and width is the width of the two-dimensional array; the image is divided into 2 pixels×2 pixels as the basic unit, each basic unit is traversed, the pooling calculation is performed for each basic unit, and the pooling result is outputted.

However, in the prior art, it is required to occupy a large amount of CPU time to prepare the pooling data, read the pooling data and write the pooling result by the master CPU, so that the time allocated by the CPU to other tasks may be less, causing the completion time of other tasks to be delayed, and the overall performance of the system may decline. In addition, in the current mainstream processor architecture, if a Cache Miss or Cache Flush operation is encountered, then the CPU needs a large amount of waiting time when performing the pooling operation, thereby reducing the pooling efficiency.

BRIEF SUMMARY

The technical problem solved by the invention is how to improve the pooling efficiency and the system performance.

In order to solve the aforementioned technical problem, an embodiment of the present invention provides a pooling method, comprising: acquiring pixel data of each row where a pooling window is located row by row, each time after the pooling window is moved vertically, wherein the size of the pooling window is N×N, N is a positive integer; writing the acquired pixel data of the first N−1 rows or a pre-pooling result thereof into a cache; performing a pooling operation on the pixel data of last row where the pooling window is located and pixel data in the cache, when the pixel data of last row is acquired; and outputting a pooling result of the pooling operation.

Optionally, the space of the cache is less than space occupied by N rows of the pixel data.

Optionally, the space of the cache is space occupied by one row of the pixel data.

Optionally, the pooling method further comprises after acquiring pixel data of each row where a pooling window is located, marking the acquired pixel data, to obtain a row number of the pixel data.

Optionally, N is equal to 2, the first row of the pixel data are written into the cache, and performing a pooling operation on the pixel data of last row and pixel data in the cache, when the pixel data of last row being acquired comprises: performing a pooling operation on a second row of pixel data and the first row of pixel data using a pooling window of 2×2, when a second row of pixel data is acquired.

Optionally, N is greater than 2, and writing the acquired pixel data of the first N−1 rows or a pre-pooling result thereof into a cache comprises: writing a first row of the pixel data into the cache, after acquiring the first row of the pixel data; for a second row to N−1th row of the pixel data, after acquiring each row of the pixel data, performing a pre-pooling operation on the acquired pixel data and the pixel data in the cache, and writing the pre-pooling result into the cache.

Optionally, the size of a pre-pooling window used in the pre-pooling operation is 1×2.

Optionally, when performing a pooling operation on the pixel data of last row and pixel data in the cache, the size of a sub-pooling window used is N×2.

Optionally, the pixel data is a convolution operation result obtained after a convolution operation.

In order to solve the aforementioned technical problem, an embodiment of the present invention provides a pooling device, comprising: an acquiring module, to acquire pixel data of each row where a pooling window is located row by row, each time after the pooling window is moved vertically, wherein the size of the pooling window is N×N, N is a positive integer; a cache, to store the pixel data of the first N−1 rows acquired by the acquiring module or a pre-pooling result thereof; a pooling operation module, to perform a pooling operation on the pixel data of last row where the pooling window is located and pixel data in the cache, when the pixel data of last row is acquired by the acquiring module, and to output a pooling result of the pooling operation.

Optionally, the space of the cache is space occupied by one row of the pixel data.

Optionally, the acquiring module marks the acquired pixel data, to obtain a row number of the pixel data.

Optionally, N is equal to 2, the first row of the pixel data are written into the cache, and the pooling operation module performs a pooling operation on a second row of pixel data and the first row of pixel data using a pooling window of 2×2, when a second row of pixel data is acquired by the acquiring module.

Optionally, N is greater than 2, and the pooling operation module comprises: a writing unit, to write a first row of the pixel data into the cache, after acquiring the first row of the pixel data; a pre-pooling operation unit, for a second row to N−1th row of the pixel data, after acquiring each row of the pixel data, to perform a pre-pooling operation on the acquired pixel data and the pixel data in the cache, and write the pre-pooling result into the cache.

Optionally, the size of a pre-pooling window used in the pre-pooling operation is 1×2.

Optionally, when the pooling operation module performs a pooling operation on the pixel data of last row and pixel data in the cache, the size of a sub-pooling window used is N×2.

Optionally, the pixel data is a convolution operation result obtained after a convolution operation.

In order to solve the aforementioned technical problem, an embodiment of the present invention provides a pooling system, comprising: a pooling device; a pixel data output component, to provide the pixel data; and storage, to receive and store the pooling result.

Optionally, the pixel data output component is a convolution operation accelerator or a central processor.

The embodiment of the invention further discloses a computer readable storage medium having computer instructions stored thereon, wherein the computer instructions when executed, perform the steps of the pooling method.

Compared with the prior art, the technical solution of the embodiment of the present invention has the following beneficial effects:

In the technical solution of the present invention, acquiring pixel data of each row where a pooling window is located row by row, each time after the pooling window is moved vertically, wherein the size of the pooling window is N×N, N is a positive integer; writing the acquired pixel data of the first N−1 rows or a pre-pooling result thereof into a cache; performing a pooling operation on the pixel data of last row where the pooling window is located and pixel data in the cache, when the pixel data of last row is acquired; outputting a pooling result of the pooling operation. The technical solution of the present invention first writes the pixel data of the first N−1 rows where a pooling window is located or a pre-pooling result thereof into the cache, and then fetches the data in the cache to perform the pooling operation, when the last row of pixel data in the pooling window is acquired; because the read-write speed of the cache is faster, which may reduce the time cost of the pooling step greatly, the pooling efficiency is high; even if the CPU performs the pooling operation, the CPU time occupied by the pooling operation can be reduced, thereby improving system performance; avoiding the problem in the prior art of low pooling efficiency caused by storing all the pixel data to be pooled into the memory and then reading from the memory. In addition, the pixel data to be pooled which has been processed in the previous step can directly participate in the pooling step of the technical solution of the present invention, thus realizing the real-time property and convenience of the pooling.

The technical solution of the present invention also discloses a pooling device, comprising: an acquiring module, to acquire pixel data of each row where a pooling window is located row by row, each time after the pooling window is moved vertically, wherein the size of the pooling window is N×N, N is a positive integer; a cache, to store the pixel data of the first N−1 rows acquired by the acquiring module or a pre-pooling result thereof; a pooling operation module, to perform a pooling operation on the pixel data of last row where the pooling window is located and pixel data in the cache, when the pixel data of last row is acquired by the acquiring module, and to output a pooling result of the pooling operation. The pooling device of the technical solution of the present invention may be dedicated to performing the pooling operation, so that the CPU may be not required to read the pixel data and perform the pooling operation, thus saving the CPU effective time, thereby the CPU being able to perform more other tasks and improving the overall system performance.

Further, the space of the cache is space occupied by one row of the pixel data. In the technical solution of the present invention, the space of the cache is space occupied by only one row of the pixel data, thus reducing the size and area of the cache circuit, which is beneficial to the hardware implementation of the pooling device.

It is to be understood that both the foregoing brief summary and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description serve to explain the principles and operations of the claimed subject matter.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

As described in the background, in the prior art, it is required to occupy a large amount of CPU time to prepare the pooling data, read the pooling data and write in the pooling result by the master CPU, so that the time allocated by the CPU to other tasks may be less, causing the completion time of other tasks to be delayed, and the overall performance of the system may decline. In addition, in the current mainstream processor architecture, if a Cache Miss or Cache Flush operation is encountered, then the CPU needs a large amount of waiting time when performing the pooling operation, thereby reducing the pooling efficiency.

The technical solution of the present invention first writes the pixel data of the first N−1 rows where a pooling window is located or a pre-pooling result thereof into the cache, and then fetches the data in the cache to perform the pooling operation, when the last row of pixel data in the pooling window are acquired; because the read-write speed of the cache is faster, which may reduce the time cost of the pooling step greatly, the pooling efficiency is high; even if the CPU performs the pooling operation, the CPU time occupied by the pooling operation can be reduced, thereby improving system performance; avoiding the problem in the prior art of low pooling efficiency caused by storing all the pixel data to be pooled into the memory and then reading from the memory. In addition, the pixel data to be pooled which has been processed in the previous step can directly participate in the pooling step of the technical solution of the present invention, realizing the real-time property and convenience of the pooling.

The specific embodiments of the present invention will be described in detail below in connection with the drawings, to make the above described objects, features, and advantages of the present invention more apparent.

Figure 1:
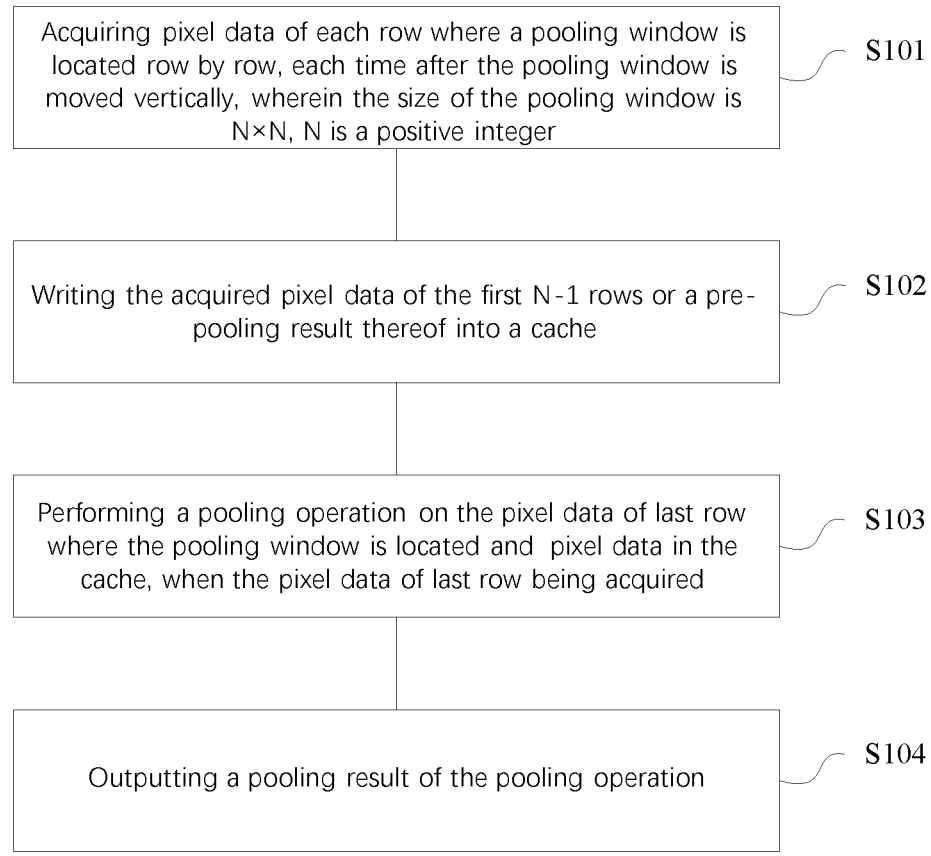
FIG. 1 is a flow diagram of a pooling method according to an embodiment of the present invention.

FIG. 1 is a flow diagram of a pooling method according to an embodiment of the present invention.

The pooling method shown in FIG. 1 may comprise the following steps:

Step S101: acquiring pixel data of each row where a pooling window is located row by row, each time after the pooling window is moved vertically, wherein the size of the pooling window is N×N, N is a positive integer;

Step S102: writing the acquired pixel data of the first N−1 rows or a pre-pooling result thereof into a cache;

Step S103: performing a pooling operation on the pixel data of last row where the pooling window is located and pixel data in the cache, when the pixel data of last row is acquired;

Step S104: outputting a pooling result of the pooling operation.

The pooling operation described in this embodiment refers to: moving the pooling window vertically and then laterally, wherein each time after moving the pooling window vertically and determining the vertical position of the pooling window, the pooling window is moved laterally, and each time moving the pooling window laterally, the pooling operation is performed on the data in the pooling window once until all the data in the horizontal row is traversed, and then the pooling window is moved vertically again until all the data to be processed are traversed. The pooling operation refers to: performing appropriate mathematical operations on all pixel data in the pooling window to obtain a pooling result, for example, calculating the average of all pixel data in the pooling window, or selecting the maximum value of all pixel data in the pooling window.

In this embodiment, the unit of the size of the pooling window is usually pixel data.

Figure 2:
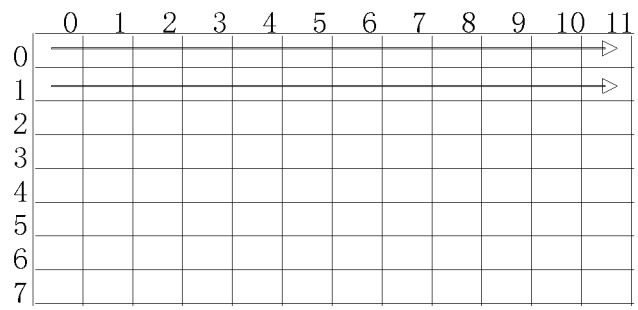
FIG. 2 is a schematic diagram of one specific application scenario of the pooling method according to an embodiment of the present invention.

In the specific implementation of step S101, the acquired pixel data are data that need to be pooled. After determining the vertical position of the pooling window, the pixel data of each row where the pooling window is located may be determined. For example, referring to FIG. 2, the size of the pooling window is 2×2 and the image size to be pooled is 12×8; when the vertical position of the pooling window is located in row 0 and row 1 of the image to be pooled, the pixel data of row 0 may be acquired first, and then the pixel data of row 1. Similarly, when the vertical position of the pooling window is located in row 2 and row 3 of the image to be pooled, the pixel data of row 2 may be acquired first, and then the pixel data of row 3, until all the pixel data of the image to be pooled are acquired.

In the specific implementation of step S102, the acquired pixel data of the first N−1 rows may be written into a cache. The cache may be a variety of suitable memories, preferably, high speed access memories, such as static random access memory (SRAM). In a non-limiting example, when the size of the pooling window is 2×2, the first row of pixel data are written into the cache; when the size of the pooling window is 3×3, the first two rows of pixel data are written into the cache. At this time, the space of the cache is the space occupied by the N−1 rows of pixel data.

It should be noted that, in practical applications, the size of the pooling window is usually fixed, for example, 2×2, 3×3, and 4×4. N has a maximum value. Therefore, in order to ensure that the cache can be used in various scenarios, the space of the cache may be the space occupied by max(N)−1 rows of pixel data.

In the embodiment of the present invention, the pre-pooling result of the acquired first N−1 rows of pixel data may also be written into the cache. For example, when the size of the pooling window is 3×3, the pre-pooling result of the pre-pooling operation on the first two rows of pixel data may be written into the cache. In this case, the space of the cache may be small, for example, the space of the cache may be the space occupied by only one row of pixel data.

The pre-pooling result may be obtained by performing a pooling operation on the first N−1 rows of pixel data.

In the specific implementation of step S103, when the pixel data of last row where the pooling window is located are acquired, the pixel data in the cache, that is, the first N−1 rows of pixel data or the pre-pooling result thereof, may be fetched, to perform a pooling operation together with the pixel data of last row. Specifically, the pooling window may be gradually moved in lateral direction, and each time after it is moved laterally, a pooling operation may be carried out on the pixel data in the pooling window (that is, cache data and pixel data of the last row falling within the current pooling window).

In turn, in the specific implementation of step S104, the pooling result of the pooling operation may be outputted. For example, the pooling result may be output to an appropriate memory for storage, or the pooling result can be output to a CPU or other component for further processing.

Specifically, the pooling operation may be mean pooling, max pooling, or random pooling. Mean pooling refers to calculating the average of all data in the pooling window as the value of this pooling operation. Max pooling refers to selecting the maximum value of all data in the pooling window as the value of this pooling operation. Random pooling refers to selecting data from all data in the pooling window randomly according to the probability value thereof, and the probability value of the data is related to the size of the data.

Optionally, in step S103, when performing a pooling operation on the pixel data of last row and pixel data in the cache, the size of a sub-pooling window used is N×2. For example, when the pooling window is 2×2, the size of a sub-pooling window is 2×2; when the pooling window is 3×3, the size of a sub-pooling window is 3×2; when the pooling window is 4×4, the size of a sub-pooling window is 4×2.

The technical solution of the present invention first writes the pixel data of the first N−1 rows where a pooling window is located or a pre-pooling result thereof into the cache, and then fetches the data in the cache to perform the pooling operation, when the last row of pixel data in the pooling window are acquired; because the read-write speed of the cache is faster, which may reduce the time cost of the pooling step greatly, the pooling efficiency is high; even if the CPU performs the pooling operation, the CPU time occupied by the pooling operation can be reduced, thereby improving system performance; avoided is the problem in the prior art of low pooling efficiency caused by storing all the pixel data to be pooled into the memory and then reading from the memory. In addition, the pixel data to be pooled processed in the previous step can directly participate in the pooling step of the technical solution of the present invention, realizing the real-time property and convenience of the pooling.

In a preferred embodiment, the space of the cache is less than space occupied by N rows of the pixel data.

Compared with the prior art which stores in the cache all the pixel data to be pooled, such as the whole image to be pooled or N rows of the pixel data in the pooling window, the data stored in the cache may be less than N rows of the pixel data. In other words, the storage space of the cache is smaller, which is beneficial to the hardware implementation.

In another preferred embodiment of the present invention, the space of the cache is space occupied by one row of the pixel data.

In an embodiment of the present invention, the space of the cache is the space occupied by only one row of the pixel data, thus reducing the size and area of the cache circuit, which is beneficial to the hardware implementation of the pooling device.

In a specific embodiment of the present invention, after the step S101 shown in FIG. 1, the following step may be included: marking the acquired pixel data, to obtain a row number of the pixel data.

In particular, after acquiring pixel data of each row in the pooling window, the acquired pixel data of this row may be marked. Continue to refer to FIG. 2, after acquiring pixel data of row 0, the row number may be marked as 0; after acquiring pixel data of row 1, the row number may be marked as 1. Or, after acquiring pixel data of row 0, the row number may be marked as 1; after acquiring pixel data of row 1, the row number may be marked as 2, and the embodiment of the present invention does not impose limitation in this regard.

In particular, all the pixel data acquired may be marked using successive row number, for example, row 0, row 1, row 2, and so on; or may be marked according to the size of the pooling window. For example, the size of the pooling window is 2×2, and the row numbers are row 0, row 1, row 0, row 1, and so on.

In another specific embodiment of the present invention, N is equal to 2, and the first row of the pixel data are written into the cache. That is to say, the size of the pooling window is 2×2.

The step S103 shown in FIG. 1 may comprise the following step: performing a pooling operation on a second row of pixel data and the first row of pixel data using a pooling window of 2×2, when a second row of pixel data are acquired.

Figure 3:
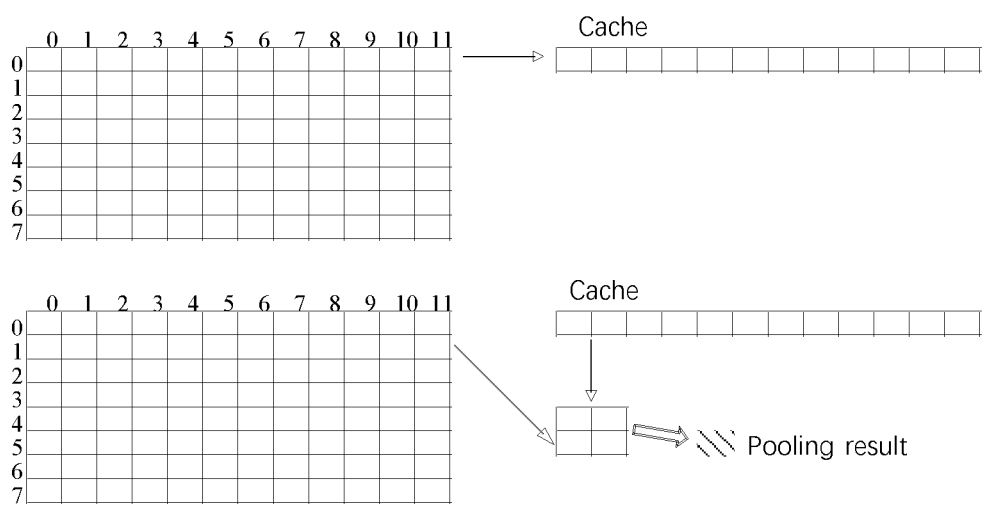
FIG. 3 is a schematic diagram of another specific application scenario of the pooling method according to an embodiment of the present invention.

Referring to FIG. 3, the first row of data in the pooling window is written into the cache. Take the stride of the pooling window that is 2-pixel data as an example to illustrate.

When the vertical position of the pooling window is located in row 0 and row 1 of the pixel data, the first row of pixel data in the pooling window are the pixel data of row 0, and the second row of pixel data in the pooling window are the pixel data of row 1. The acquired pixel data of row 0 are written into the cache, and when the pixel data of row 1 are acquired, the pixel data of row 0 may be fetched from the cache, to perform the pooling operation on the pixel data of row 0 and row 1, and output the pooling result (shown in the shadow portion of FIG. 3).

In the same manner, when the vertical position of the pooling window is located in row 2 and row 3 of the pixel data, the first row of pixel data in the pooling window are the pixel data of row 2, and the second row of pixel data in the pooling window are the pixel data of row 3. The acquired pixel data of row 2 are written into the cache, and when the pixel data of row 3 are acquired, the pixel data of row 2 may be fetched from the cache, to perform the pooling operation on the pixel data of row 2 and row 3, and output the pooling result.

In another specific embodiment of the present invention, N is bigger than 2.

The step S103 shown in FIG. 1 may comprise the following step:

writing a first row of the pixel data into the cache, after acquiring the first row of the pixel data;

for a second row to N−1th row of the pixel data, after acquiring each row of the pixel data, performing a pre-pooling operation on the acquired pixel data and the pixel data in the cache, and writing the pre-pooling result into the cache.

Figure 4:
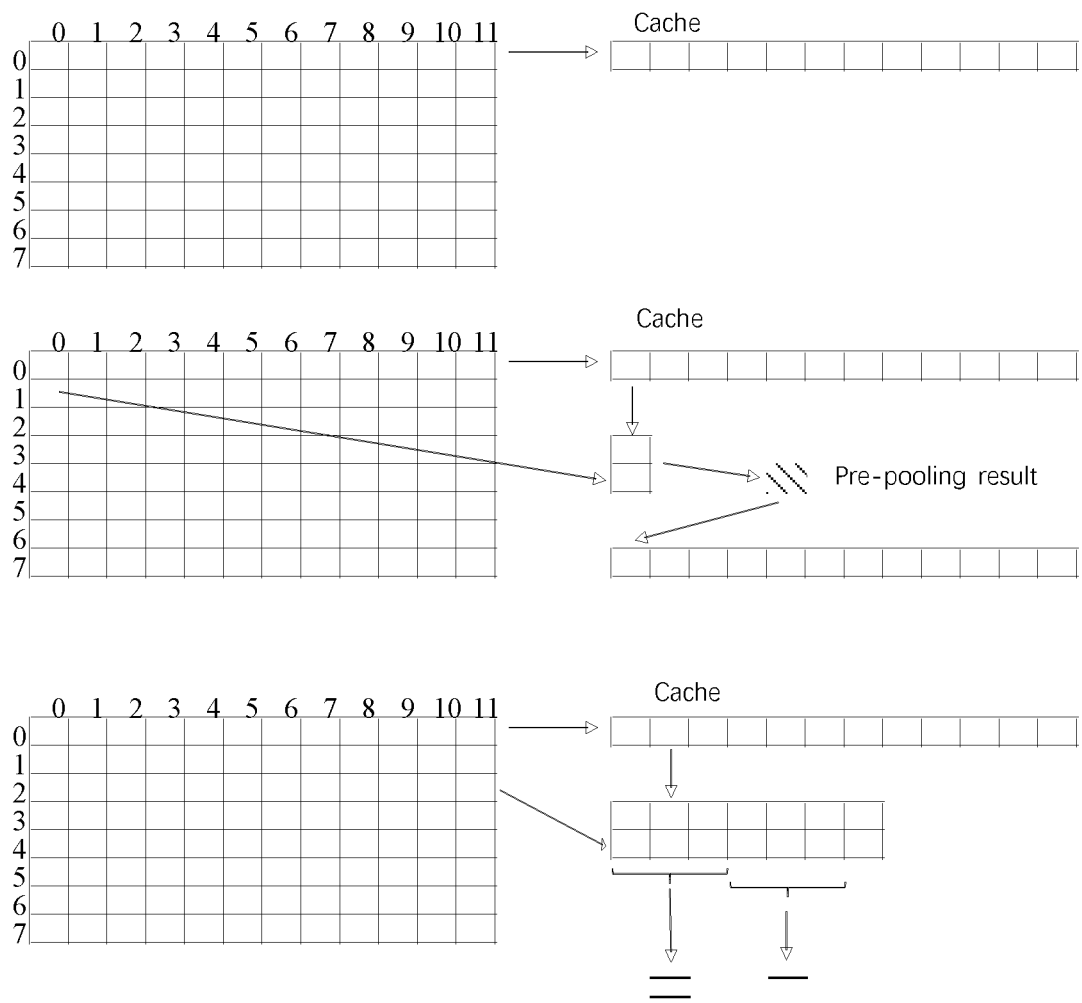
FIG. 4 is a schematic diagram of further specific application scenario of the pooling method according to an embodiment of the present invention.

Referring to FIG. 4, take the pooling window of 3×3 and the stride of 3-pixel data as an example to illustrate.

When the vertical position of the pooling window is located in row 0, row 1, and row 2 of the pixel data, the first row of pixel data in the pooling window are the pixel data of row 0, the second row of pixel data in the pooling window are the pixel data of row 1, and the third row of pixel data in the pooling window are the pixel data of row 2. The acquired pixel data of row 0 are written into the cache, and when the pixel data of row 1 are acquired, the pixel data of row 0 may be fetched from the cache, to perform the pre-pooling operation on the pixel data of row 0 and row 1, and write the pre-pooling result (shown in the oblique stripe shadow portion of FIG. 4) into the cache. At this time, the cache only stores the pre-pooling result which is one entire row of pixel data, that is, pixel data of 12×1. When the pixel data of row 2 are acquired, the pre-pooling result may be fetched from the cache, to perform the pooling operation on the pixel data of row 2 and the pre-pooling result, and output the pooling result (shown in the cross stripe shadow portion of FIG. 4).

In the same manner, when the vertical position of the pooling window is located in row 3, row 4, and row 5 of the pixel data, the first row of pixel data in the pooling window are the pixel data of row 3, the second row of pixel data in the pooling window are the pixel data of row 4, and the third row of pixel data in the pooling window are the pixel data of row 5. The acquired pixel data of row 3 are written into the cache, and when the pixel data of row 4 are acquired, the pixel data of row 3 may be fetched from the cache, to perform the pre-pooling operation on the pixel data of row 3 and row 4, and write the pre-pooling result into the cache. At this time, the cache only stores the pre-pooling result which is one entire row of pixel data, that is, pixel data of 12×1. When the pixel data of row 5 are acquired, the pre-pooling result may be fetched from the cache, to perform the pooling operation on the pixel data of row 5 and the pre-pooling result, and output the pooling result.

In another implementation of the embodiment of the invention, continue to refer to FIG. 4, the pooling window is 3×3 and the stride is 2-pixel data.

In this embodiment, N of the pooling window is bigger than the stride, thus the pooling unit is 3×3=9 pixel data, and there are three pixel data overlap between adjacent two pooling units.

In particular, when the vertical position of the pooling window is located in row 0, row 1, and row 2 of the pixel data, refer to the preceding embodiments for the specific implementation, which will not be repeated here.

After moving the pooling window vertically, the vertical position of the pooling window is located in row 2, row 3, and row 4 of the pixel data, the first row of pixel data in the pooling window are the pixel data of row 2, the second row of pixel data in the pooling window are the pixel data of row 3, and the third row of pixel data in the pooling window are the pixel data of row 4. The acquired pixel data of row 2 are written into the cache, and when the pixel data of row 3 are acquired, the pixel data of row 2 may be fetched from the cache, to perform the pre-pooling operation on the pixel data of row 2 and row 3, and write the pre-pooling result into the cache. When the pixel data of row 4 are acquired, the pre-pooling result may be fetched from the cache, to perform the pooling operation on the pixel data of row 4 and the pre-pooling result, and output the pooling result.

The same applies to the following steps.

Figure 5:
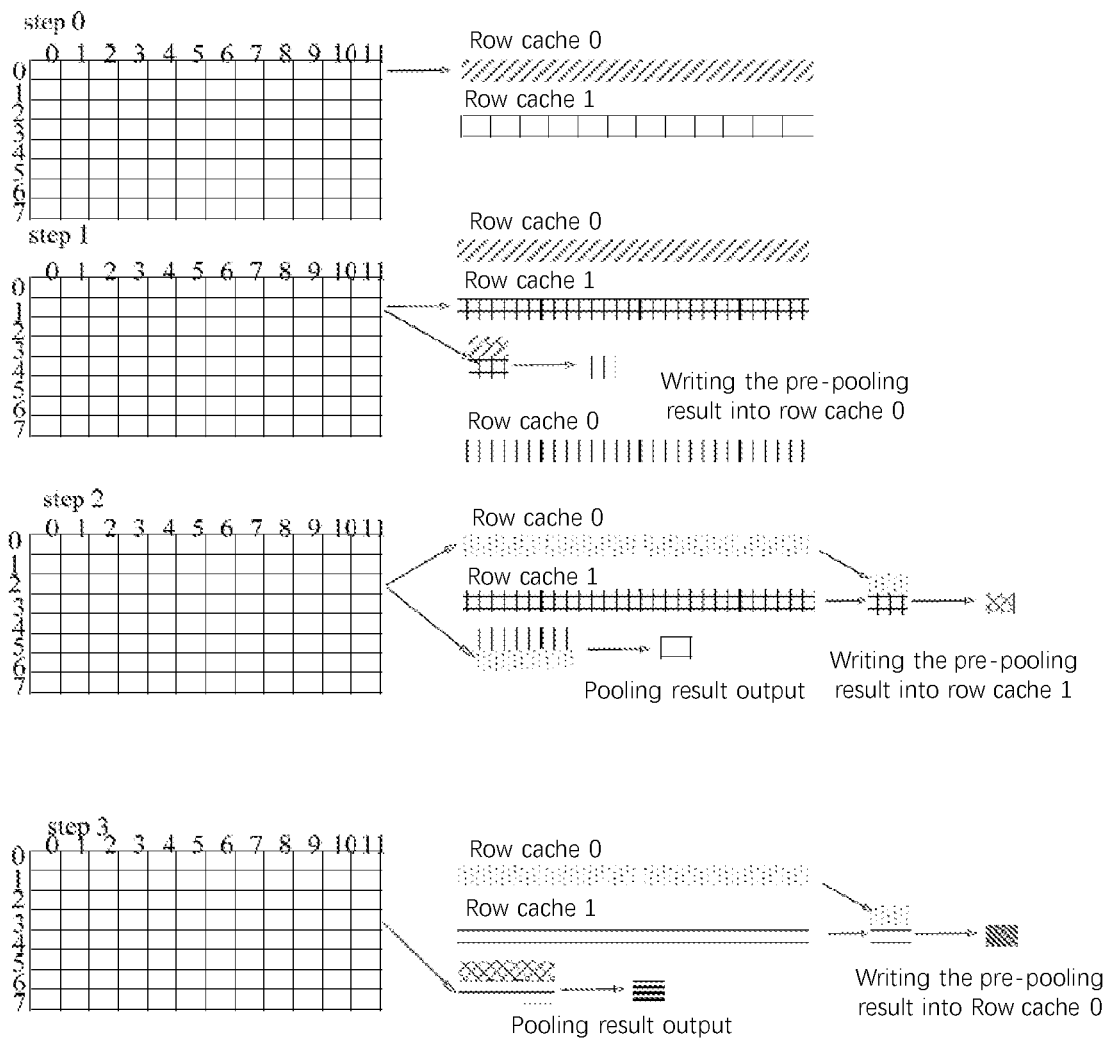
FIG. 5 is a schematic diagram of still further specific application scenario of the pooling method according to an embodiment of the present invention.

Referring to FIG. 5, take the pooling window of 3×3 and the stride of 1 pixel data as an example to illustrate. In vertical position, there are two rows of pixel data overlap between adjacent pooling windows. The space of the occupied cache is the space of two rows of pixel data, that is, row cache 0 and row cache 1.

In this embodiment, each row of pixel data is fetched only once.

When the vertical position of the pooling window is located in row 0, row 1, and row 2 of the pixel data, the first row of pixel data in the pooling window are the pixel data of row 0, the second row of pixel data in the pooling window are the pixel data of row 1, and the third row of pixel data in the pooling window are the pixel data of row 2. The acquired pixel data of row 0 are written into the row cache 0, and when the pixel data of row 1 are acquired, the pixel data of row 0 may be fetched from the row cache 0, to perform the pre-pooling operation on the pixel data of row 0 and row 1, and write the pre-pooling result into the row cache 0. At the same time, the pixel data of row 1 are written into the row cache 1. When the pixel data of row 2 are acquired, the pre-pooling result may be fetched from the row cache 0, to perform the pooling operation on the pixel data of row 2 and the pre-pooling result, and output the pooling result.

While the pixel data of row 2 are written into the row cache 0, the pre-pooling operation is performed on the pixel data in row cache 1 and the pixel data of row 2, and the pre-pooling result is written into the row cache 1. It can be understood that the pooling operation, writing operation and pre-pooling operation can be performed at the same time; and the hardware device can support the concurrent performing of above operations.

When the vertical position of the pooling window is located in row 1, row 2, and row 3 of the pixel data, the first row of pixel data in the pooling window are the pixel data of row 1, the second row of pixel data in the pooling window are the pixel data of row 2, and the third row of pixel data in the pooling window are the pixel data of row 3. When the pixel data of row 3 are acquired, the pre-pooling result may be fetched from the row cache 1, to perform the pooling operation on the pixel data of row 3 and the pre-pooling result, and output the pooling result.

While the pixel data of row 3 are written into the row cache 1, the pre-pooling operation is performed on the pixel data in row cache 0 and the pixel data of row 3, and the pre-pooling result is written into the row cache 0.

In the same manner, when the vertical position of the pooling window is located in row 2, row 3, and row 4 of the pixel data, the processing of the pixel data of row 4 is the same as the processing of the pixel data of row 2; the processing of the pixel data of row 5 is the same the processing of the pixel data of row 3.

It should be noted that when the size of pooling window is N×N, the stride is K, and each row of pixel data is fetched only once, the space of the cache is the space of N−K rows of pixel data.

In the another implementation of the invention, in vertical position, there are two rows of pixel data overlap between adjacent pooling windows, thus overlapping two rows of pixel data can be acquired repeatedly. For example, when the vertical position of the pooling window is located in row 0, row 1, and row 2 of the pixel data, row 0, row 1, and row 2 of the pixel data are acquired in turn; when the vertical position of the pooling window is located in row 1, row 2, and row 3 of the pixel data, row 1, row 2, and row 3 of the pixel data are acquired in turn; wherein row 1, row 2 of the pixel data are acquired repeatedly.

Further, in the embodiments shown in FIGS. 3 to 5, the size of pre-pooling window used in pre-pooling operation is 1×2, that is, row 1, row 2 of the pixel data. The size of pooling window may ensure that the cache space is the space occupied by the one row of pixel data.

In another specific embodiment of the present invention, the pixel data is a convolution operation result obtained after a convolution operation. Of cause, the pixel data may other suitable pixel data, for example, data without convolution operation being carried out on the data.

The embodiment of the present invention may perform pooling on the result of convolution operation, which may reduce the amount of the features in the result of convolution operation, for operations such as classification, recognition and so on.

Figure 6:
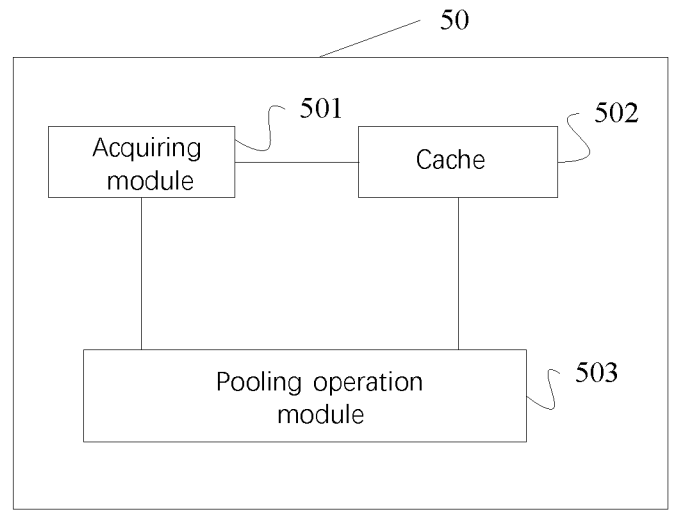
FIG. 6 is a structure schematic diagram of a pooling device according to an embodiment of the present invention.

Referring to FIG. 6, the pooling device 50 may include an acquiring module 501, a cache 502, and a pooling operation module 503.

The acquiring module 501 herein is adapted to acquire pixel data of each row where a pooling window is located row by row, each time after the pooling window is moved vertically, wherein the size of the pooling window is N×N, N is a positive integer;

The cache 502 is adapted to store the pixel data of the first N−1 rows acquired by the acquiring module 501 or a pre-pooling result thereof;

The pooling operation module 503 is adapted to perform a pooling operation on the pixel data of last row where the pooling window is located and pixel data in the cache 502, when the pixel data of last row is acquired by the acquiring module 501, and to output a pooling result of the pooling operation.

In this embodiment, the pooling device 50 can perform the pooling operation, to avoid reading the pixel data and performing pooling operation by CPU, thereby saving the effective time of the CPU, so that the CPU may perform more other tasks and improve the overall performance of the system.

The cache 502 may be a variety of suitable memories, preferably, high speed memories, such as static random access memory (SRAM).

In a preferred embodiment of the present invention, the space of the cache is space occupied by one row of the pixel data.

In an embodiment of the present invention, the space of the cache is only the space occupied by one row of the pixel data, thus reducing the size and area of the cache, which is beneficial to the hardware implementation of the pooling device 50.

In a specific embodiment of the present invention, the acquiring module 501 may mark the acquired pixel data, to obtain a row number of the pixel data.

In another specific embodiment of the present invention, N is equal to 2, the first row of the pixel data are written into the cache 502, and the pooling operation module 503 performs a pooling operation on a second row of pixel data and the first row of pixel data using a pooling window of 2×2, when a second row of pixel data are acquired by the acquiring module.

In still another specific embodiment of the present invention, N is greater than 2, and the pooling operation module 503 may comprise: a writing unit (not shown), to write a first row of the pixel data into the cache, after acquiring the first row of the pixel data; a pre-pooling operation unit (not shown), for a second row to N−1th row of the pixel data, after acquiring each row of the pixel data, to perform a pre-pooling operation on the acquired pixel data and the pixel data in the cache 502, and write the pre-pooling result into the cache 502.

Further, the size of a pre-pooling window used in the pre-pooling operation is 1×2.

In another preferred embodiment of the present invention, when the pooling operation module 503 performs a pooling operation on the pixel data of last row and pixel data in the cache, the size of a sub-pooling window used is N×2.

The pooling device 50 may be a dedicated hardware device that may be implemented based on various programmable logic circuits, such as an FPGA; or may be implemented with an application specific integrated circuit, such as an ASIC. The cache 502 may be a memory integrated in a hardware device, such as a memory integrated in an ASIC or an FPGA.

For more details on the working principle and working mode of the pooling device 50, reference may be made to the related descriptions in FIG. 1 to FIG. 4, and details are not described herein again.

Figure 7:
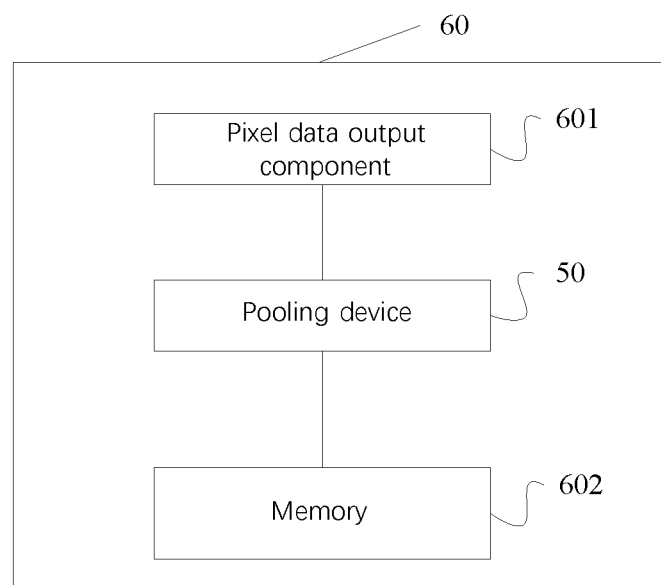
FIG. 7 is a structure schematic diagram of a pooling system according to an embodiment of the present invention.

Referring to FIG. 7, the pooling system 60 may comprise a pixel data output component 601, the pooling device 50 shown in FIG. 5, and a memory 602.

The pixel data output component 601 herein is adapted to output the pixel data.

The memory 602 is adapted to receive and store the pooling results.

In this embodiment, the pooling system 60 may perform a complete pooling operation. The pooling system 60 may avoid reading the pixel data and performing pooling operation by CPU, thereby saving the effective time of the CPU, so that the CPU may perform more other tasks and improve the overall performance of the system.

It may be understood that the pooling system 60 may be built into any implementable terminal device, such as a computer, a tablet, a smart phone, and the like.

Further, the pixel data output component 601 may be a convolution operation accelerator or a central processor.

The convolution operation accelerator may perform a convolution operation on the image data, and the convolution operation result may be outputted to the pooling device 50 for performing the pooling operation.

The pooling device 50 may also acquire the pixel data from a central processor. More specifically, the pixel data of the central processor may be acquired from a convolutional operation accelerator, or may be acquired from any other implementable device, which is not limited by the embodiment of the present invention.

In a typical pooling system 60, the pixel output component 601 may be a CPU. Since the pooling device 50 stores the pixel data by using an internally integrated cache, the cache is independent of the memory adapted to the CPU, so that the CPU does not need to access the memory frequently, and since the access speed of the cache may usually be higher than the memory, the execution of the pooling operation is more quickly and efficient.

The embodiment of the invention further discloses a computer readable storage medium having computer instructions stored thereon, the computer instructions when executed, may perform the steps of the pooling method shown in FIG. 1. The computer readable storage medium may include a ROM, a RAM, a magnetic disk, or an optical disk. The storage medium may also include a non-volatile memory, non-transitory memory or the like. The computer readable storage medium may be used by a computer or a device equivalent to computer to execute computer instructions stored thereon to perform the pooling method of embodiments of the present invention.

While the embodiments disclosed herein have been set forth for the purpose of illustration, the foregoing description should not be deemed to be a limitation on the scope of the disclosure or the appended claims. Accordingly, various modifications, adaptations, and alternatives may occur to one skilled in the art without departing from the spirit and scope of the present disclosure or the appended claims.

What is claimed is:

1. A pooling method, comprising:
acquiring pixel data of each row where a pooling window is located row by row, each time after the pooling window is moved vertically, wherein a size of the pooling window is N×N, N is a positive integer;
marking the acquired pixel data, to obtain a row number of the pixel data;
writing the acquired pixel data of the first N−1 rows or a pre-pooling result thereof into a cache;
performing a pooling operation on the pixel data of a last row where the pooling window is located and pixel data in the cache, when the pixel data of the last row is acquired; and
outputting a pooling result of the pooling operation.

2. The pooling method of claim 1, wherein a space of the cache is less than a space occupied by N rows of the pixel data.

3. The pooling method of claim 1, wherein a space of the cache is a space occupied by one row of the pixel data.

4. The pooling method of claim 1, wherein N is equal to 2, a first row of the pixel data are written into the cache, and performing the pooling operation on the pixel data of the last row and the pixel data in the cache, when the pixel data of the last row is acquired comprises:
performing the pooling operation on a second row of pixel data and the first row of the pixel data using a pooling window of 2×2, when the second row of pixel data is acquired.

5. The pooling method of claim 1, wherein N is greater than 2, and writing the acquired pixel data of the first N−1 rows or the pre-pooling result thereof into the cache comprises:
writing a first row of the pixel data into the cache, after acquiring the first row of the pixel data; and
for a second row to N−1th row of the pixel data, after acquiring each row of the pixel data, performing a pre-pooling operation on the acquired pixel data and the pixel data in the cache, and writing the pre-pooling result into the cache.

6. The pooling method of claim 5, wherein a size of a pre-pooling window used in the pre-pooling operation is 1×2.

7. The pooling method of claim 1, wherein when performing the pooling operation on the pixel data of the last row and the pixel data in the cache, a size of a sub-pooling window used is N×2.

8. The pooling method of claim 1, wherein the pixel data is a convolution operation result obtained after a convolution operation.

9. A pooling device, comprising:
an acquiring module, configured to acquire pixel data of each row where a pooling window is located row by row and mark the acquired pixel data to obtain a row number of the pixel data, each time after the pooling window is moved vertically, wherein a size of the pooling window is N×N, N is a positive integer;
a cache, configured to store the pixel data of the first N−1 rows acquired by the acquiring module or a pre-pooling result thereof; and
a pooling operation module, configured to perform a pooling operation on the pixel data of a last row where the pooling window is located and pixel data in the cache, when the pixel data of the last row is acquired by the acquiring module, and to output a pooling result of the pooling operation.

10. The pooling device of claim 9, wherein a space of the cache is a space occupied by one row of the pixel data.

11. The pooling device of claim 9, wherein N is equal to 2, a first row of the pixel data are written into the cache, and the pooling operation module performs the pooling operation on a second row of pixel data and the first row of the pixel data using a pooling window of 2×2, when the second row of pixel data is acquired by the acquiring module.

12. The pooling device of claim 9, wherein N is greater than 2, and the pooling operation module comprises:
a writing unit, to write a first row of the pixel data into the cache, after acquiring the first row of the pixel data; and
a pre-pooling operation unit, for a second row to N−1th row of the pixel data, after acquiring each row of the pixel data, to perform a pre-pooling operation on the acquired pixel data and the pixel data in the cache, and write the pre-pooling result into the cache.

13. The pooling device of claim 12, wherein a size of a pre-pooling window used in the pre-pooling operation is 1×2.

14. The pooling device of claim 9, wherein when the pooling operation module performs the pooling operation on the pixel data of the last row and the pixel data in the cache, a size of a sub-pooling window used is N×2.

15. The pooling device of claim 9, wherein the pixel data is a convolution operation result obtained after a convolution operation.

16. A non-transitory computer readable storage medium having computer instructions stored thereon, wherein when the computer instructions being executed, a processor is configured to perform a pooling method, the method comprising:
acquiring pixel data of each row where a pooling window is located row by row, each time after the pooling window is moved vertically, wherein a size of the pooling window is N×N, N is a positive integer;
marking the acquired pixel data, to obtain a row number of the pixel data;
writing the acquired pixel data of first N−1 rows or a pre-pooling result thereof into a cache;
performing a pooling operation on the pixel data of a last row where the pooling window is located and pixel data in the cache, when the pixel data of the last row is acquired; and
outputting a pooling result of the pooling operation.

17. The storage medium of claim 16, wherein a space of the cache is less than a space occupied by N rows of the pixel data.

18. The storage medium of claim 16, wherein N is equal to 2, a first row of the pixel data are written into the cache, and performing the pooling operation on the pixel data of the last row and the pixel data in the cache, when the pixel data of the last row is acquired comprises:
performing the pooling operation on a second row of pixel data and the first row of the pixel data using a pooling window of 2×2, when the second row of pixel data is acquired.

19. The storage medium of claim 16, wherein N is greater than 2, and writing the acquired pixel data of the first N−1 rows or the pre-pooling result thereof into the cache comprises:
writing a first row of the pixel data into the cache, after acquiring the first row of the pixel data; and
for a second row to N−1th row of the pixel data, after acquiring each row of the pixel data, performing a pre-pooling operation on the acquired pixel data and the pixel data in the cache, and writing the pre-pooling result into the cache.

20. The storage medium of claim 16, wherein when performing the pooling operation on the pixel data of the last row and the pixel data in the cache, a size of a sub-pooling window used is N×2.

* * * * *